United States Patent
Dykema et al.

(10) Patent No.: US 8,244,930 B1
(45) Date of Patent: Aug. 14, 2012

(54) MECHANISMS FOR SYNCHRONIZING DATA TRANSFERS BETWEEN NON-UNIFORM MEMORY ARCHITECTURE COMPUTERS

(75) Inventors: Greg L. Dykema, Redwood City, CA (US); David H. Bassett, San Jose, CA (US); Joel L. Lach, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 99 days.

(21) Appl. No.: 12/774,280

(22) Filed: May 5, 2010

(51) Int. Cl.
  *G06F 3/00* (2006.01)
  *G06F 13/00* (2006.01)

(52) U.S. Cl. ............... 710/22; 710/28; 710/31; 710/33; 710/35

(58) Field of Classification Search .............. 710/22, 710/28, 31, 33, 35
See application file for complete search history.

(56) References Cited

U.S. PATENT DOCUMENTS

| | | | | |
|---|---|---|---|---|
| 4,177,451 A * | 12/1979 | Yamaguchi | .............. | 370/296 |
| 5,590,124 A * | 12/1996 | Robins | .............. | 370/258 |
| 6,031,843 A * | 2/2000 | Swanbery et al. | .............. | 370/426 |
| 6,279,050 B1 * | 8/2001 | Chilton et al. | .............. | 710/20 |
| 6,418,488 B1 * | 7/2002 | Chilton et al. | .............. | 710/20 |

* cited by examiner

*Primary Examiner* — Alford Kindred
*Assistant Examiner* — Getente A Yimer (57) ABSTRACT

A first node includes a DMA engine for transferring data specified by a sequence of control blocks to a second node. When a control block does not require synchronization between memories, the DMA engine sends an end of transfer (EOT) message after the last datum, increments an EOT counter, and processes the next control block. When a control block requires synchronization and the EOT counter is at zero, the DMA engine sends an EOT with a flag after the last datum, increments the EOT counter, and waits for the EOT counter to return to zero before processing the next control block. A memory controller at the second node detects the EOT with or without a flag and generates an EOT acknowledgement with or without a flag. When a link interface at the second node detects the EOT acknowledgement with a flag, it sends an interrupt to a local processor complex.

8 Claims, 9 Drawing Sheets

FIG. 1
(Background)

MECHANISMS FOR SYNCHRONIZING DATA TRANSFERS BETWEEN NON-UNIFORM MEMORY ARCHITECTURE COMPUTERS

FIELD OF INVENTION

This invention relates to method and apparatus for synchronizing data transfers between two computers each having multiple independent memory controllers.

DESCRIPTION OF RELATED ART

Figure 1:
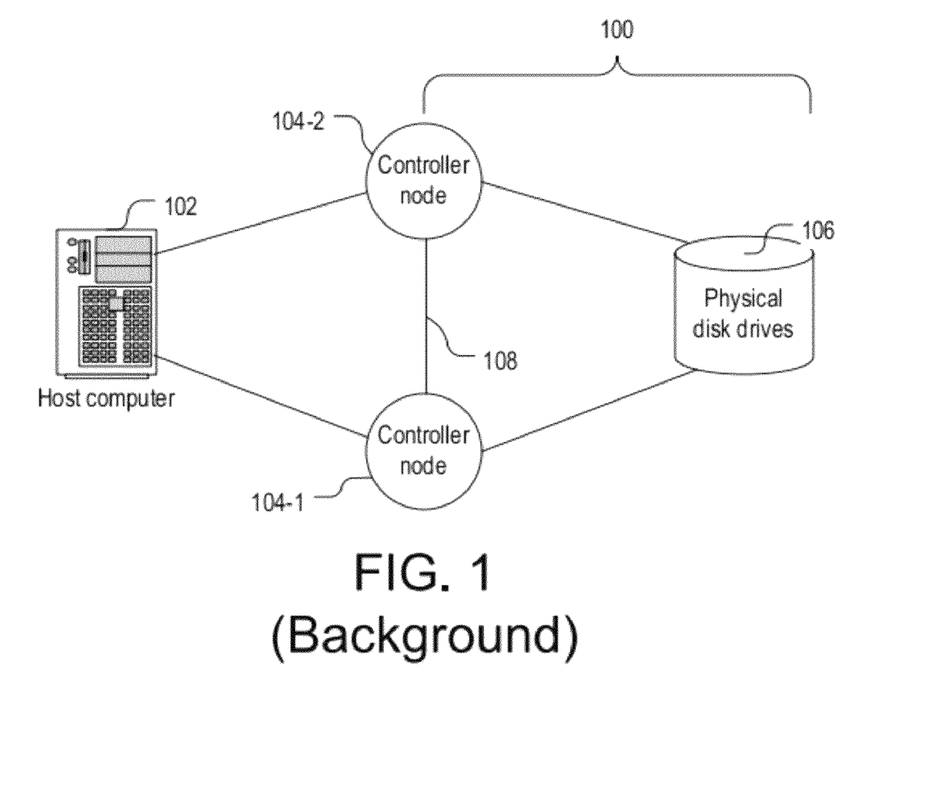
FIG. 1 illustrates a storage server coupled to a host computer.

FIG. 1 illustrates a storage server 100 coupled to a host computer 102. Storage server 100 includes nodes 104-1 and 104-2 each coupled to physical disk drives 106. Nodes 104-1 and 104-2 are interconnected by a primary high speed node-to-node link 108. Each node is coupled to host computer 102. Each node contains separate memory and processor complexes for data movement and control functions. Physical disk drives 106 are mounted in one or more drive magazines in one or more drive cages.

Pairing of nodes 104-1 and 104-2 is provided for clustering and redundancy. Additional pairs of controller nodes and additional physical disk drives may be added to scale up storage server 100. Links 108 between the nodes may be implemented as a passive full-mesh backplane. Software on nodes 104-1 and 104-2 virtualizes the storage space in physical disk drives 106 as virtual volumes and provides the virtual volumes as logical disks with logical blocks to host computer 102.

SUMMARY

In one embodiment of the invention, a first node includes a DMA engine for transferring data specified by a sequence of control blocks to a second node. When a control block does not require synchronization between memories of the first and the second nodes, the DMA engine sends an end of transfer (EOT) message after the last datum, increments an EOT counter of outstanding EOT messages, and processes the next control block. When a control block requires synchronization between the memories of the first and the second nodes, the DMA engine determines if the EOT counter is at zero. When the EOT counter is at zero, the DMA engine sends an EOT message with a synchronization flag after the last datum and increments the EOT counter. The DMA engine then waits again for the EOT counter to return to zero, indicating the EOT message with the synchronization flag has been acknowledged by the second node, before processing the next control block.

A receiving memory controller at the second node detects EOT messages and generates EOT acknowledgements. When an EOT message has a synchronization flag, the receiving memory controller generates an EOT acknowledgement with a synchronization flag. When a link interface at the second node detects an EOT acknowledgement with a synchronization flag, it sends an interrupt to a local processor complex. When the DMA engine at the first node receives an EOT acknowledgement, it decrements the EOT counter.

BRIEF DESCRIPTION OF THE DRAWINGS

In the drawings.

Use of the same reference numbers in different figures indicates similar or identical elements.

DETAILED DESCRIPTION

Figure 2:
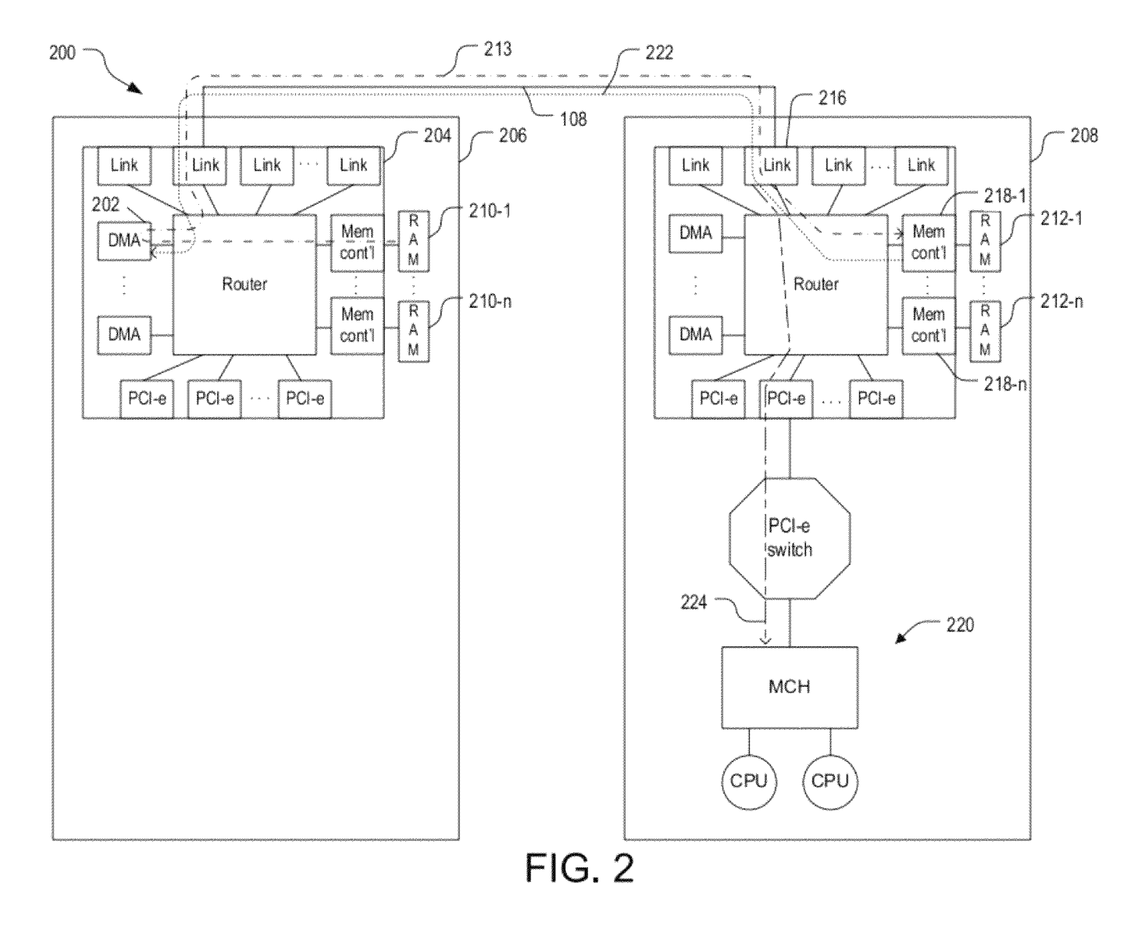
FIG. 2 is a block diagram demonstrating a data transfer between two controller nodes in one or more embodiments of the present disclosure.

FIG. 2 is a block diagram of a storage server 200 in one or more embodiments of the present disclosure. FIG. 2 is used to demonstrate a data transfer in one or more embodiments of the present disclosure. Although not shown, storage server 200 may be coupled to host computers and physical disk drives like storage server 100 (FIG. 1).

A direct memory access (DMA) engine 202 in a data transfer ASIC (application specific integrated circuit) 204 at a sending node or computer system 206 moves data to a receiving node or computer system 208. For example, sending node 206 may replicate data to receiving node 208 before flushing the data to the physical disk drives for fault tolerance. Alternatively, sending node 206 may perform complex messaging involving a large transfer of data to receiving node 208 for further processing at the receiving node.

DMA engine 202 processes a sequence of control blocks, one at a time, which tells it where to read the data (one or more sources) and where to write the data (the destination). For example, the one or more sources may be one or more addresses in local data cache memory 210-1 at sending node 206, and the destination may be an address in a remote data cache memory 212-1 at receiving node 208. DMA engine 202 reads the data from local data cache memories 210-1 and sends data writes 213 (e.g., PCI data writes) over a link 108 between nodes 206 and 208. A receiving link interface logic 216 at receiving node 208 routes data writes 213 to a receiving memory controller 218-1 for remote data cache memory 212-1. Receiving node 208 includes multiple independent memory controllers 218-1 to 218-n for respective remote data cache memories 212-1 to 212-n.

Higher level software at sending node 206 may set synchronization points in the sequence of control blocks so it knows all the prior data writes are correctly ordered at receiving node 208 so any read of remote data cache memories 212-1 to 212-n will return the same data as local data cache memories 210-1 to 210-n. Once synchronized, a local processor complex 220 (e.g., one or more processors and a Northbridge controller, such as a chipset including a memory controller hub (MCH)) at receiving node 208 may be interrupted so higher level software knows it has the current data for recovery or further processing. Accordingly, method and apparatus are provided to achieve the synchronization efficiently so it can be performed over a wide variety of communication links without requiring special synchronization features on the link itself.

In one or more embodiments of the present disclosure, additional logics have been added to the DMA engines at sending node 206, and the receiving link interface logics and the receiving memory controllers at receiving node 208. Using the above example, when DMA engine 202 on sending node 206 finishes a data transfer described by a control block, it now sends an End of Transfer (EOT) message after the last datum to receiving memory controller 218-1 at receiving node 208. The EOT message is in the form of a data write to an address reserved for EOT messages. At the same time, DMA engine 202 now increments a count of the number of outstanding EOT messages.

Each node may have multiple independent transfer paths by which data writes, including EOT messages, may travel on their way from source to destination. No ordering constraint is required between the independent transfer paths, which means that data writes over different transfer paths may arrive at receiving memory controllers 218-1 to 218-n at receiving node 208 in a different order than they were processed by DMA engine 202. Order is maintained for any given transfer path, which means the data writes travelling over the same transfer path arrive at the same receiving memory controller in the same order that they were processed by DMA engine 202. DMA engine 202 uses the same transfer path for the data writes that make up the data transfer described by any given control block. Thus, for any given control block, the same receiving memory controller receives the EOT message after having received all of the data writes.

When receiving memory controller 218-1 at receiving node 208 encounters the EOT message, all the data writes 213 of the data transfer have been safely received by the receiving memory controller such that any read of its remote data cache memory 212-1 is guaranteed to see the new data of the control block. In response to the EOT message, receiving memory controller 218-1 now sends an EOT acknowledgement 222 back to DMA engine 202 at sending node 206.

When DMA engine 202 at sending node 206 receives the EOT acknowledgement, it decrements the outstanding EOT count.

When a given control block requires synchronization of local data cache memories 210-1 to 210-n at sending node 206 and remote data cache memories 212-1 to 212-n at receiving node 208, DMA engine 202 behaves differently. In that case, DMA engine 202 now waits until its count of the outstanding EOT messages is zero before sending an EOT message with a synchronization flag for the control block and incrementing the outstanding EOT count. This implies that the data writes of all of the previous data transfers for previous control blocks up to the last synchronization point have been safely received by memory controllers 218-1 to 218-n at receiving node 208 such that any read of the remote data cache memories 212-1 to 212-n at the receiving node is guaranteed to see the new data of all the control blocks up to the last synchronization point. After sending the EOT message with the synchronization flag, DMA engine 202 again waits until the outstanding EOT count returns to zero before processing the next control block to ensure the EOT message with the synchronization flag has been acknowledged.

On receiving node 208, receiving memory controller 218-1 now acknowledges EOT message 222 with the synchronization flag with an acknowledgement with a synchronization flag. When receiving link interface logic 216 at receiving node 208 detects the acknowledgement with the synchronization flag being sent back to sending node 206, it now generates an interrupt 224 to local processor complex 220 of the receiving node. This informs local processor complex 220 that data synchronization has been achieved.

When the acknowledgement with the synchronization flag is received by DMA engine 202, it decrements the outstanding EOT count. As the outstanding EOT count is again zero, DMA engine 202 knows that data synchronization has been achieved and it can process the next control block.

Hereafter the node hardware and methods performed by the node hardware for implementing one or more embodiments of the present disclosure are introduced.

Figure 3:
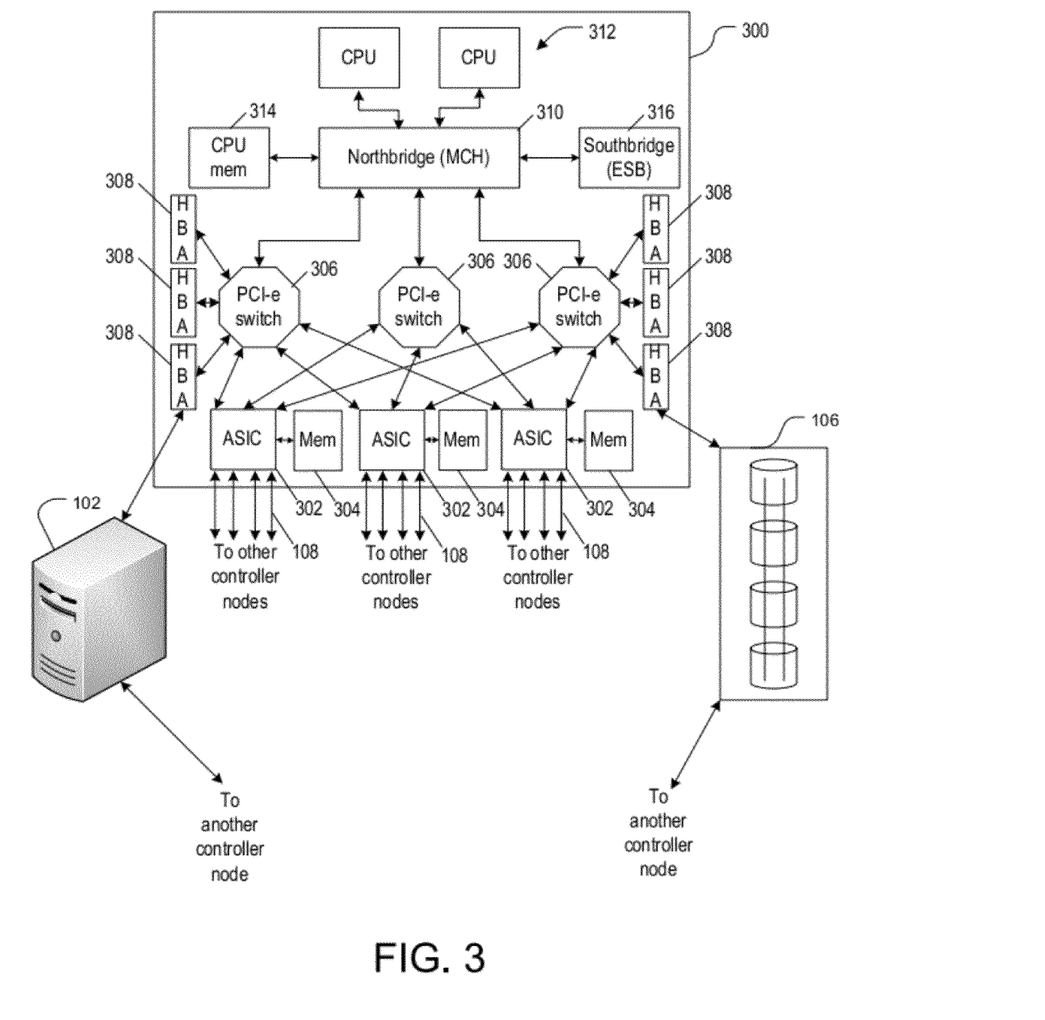
FIG. 3 illustrates a block diagram of a node in one or more embodiments of the present disclosure.

FIG. 3 illustrates a block diagram of node 300 in one or more embodiments of the present disclosure. Node 300 represents node 206 and 208 in storage server 200. Node 300 includes data transfer ASICs 302, data cache memories 304, PCI-e switches 306, host bus adapters 308, a Northbridge controller 310 (e.g., a chipset including an MCH), a processor complex 312 (e.g., one or more processors), control cache memories 314, and a Southbridge controller 316 (e.g., a chipset including enterprise Southbridge (ESB)). As will be described later, each ASIC 302 include multiple independent memory controllers for accessing respective data cache memories 304.

Each ASIC 302 is paired with its own data cache memories 304. PCI-e switches 306 provide data paths between ASICs 302, host bus adapters 308, and Northbridge controller 310. One or more host computers 102 and one or more physical disk drives 106 are connected by one or more host bus adapter 308 to node 300. ASICs 302 handle data movement between nodes, such as from local data cache memories 304 to remote data cache memories 304 at another node via high-speed links 108. Northbridge controller 310 provides data paths between PCI-e switches 306, processor complex 312, control cache memories 314, and Southbridge controller 316. Processor complex 312 execute software loaded in control cache memories 314 for virtualizing the storage space in physical disk drives 106, including mapping virtual volumes to physical storage across multiple nodes and processing control operations. Southbridge controller 316 provides processor complex 312 access to peripheral devices (not shown), such as a display, a keyboard, and a local hard disk for storing the software.

Figure 4:
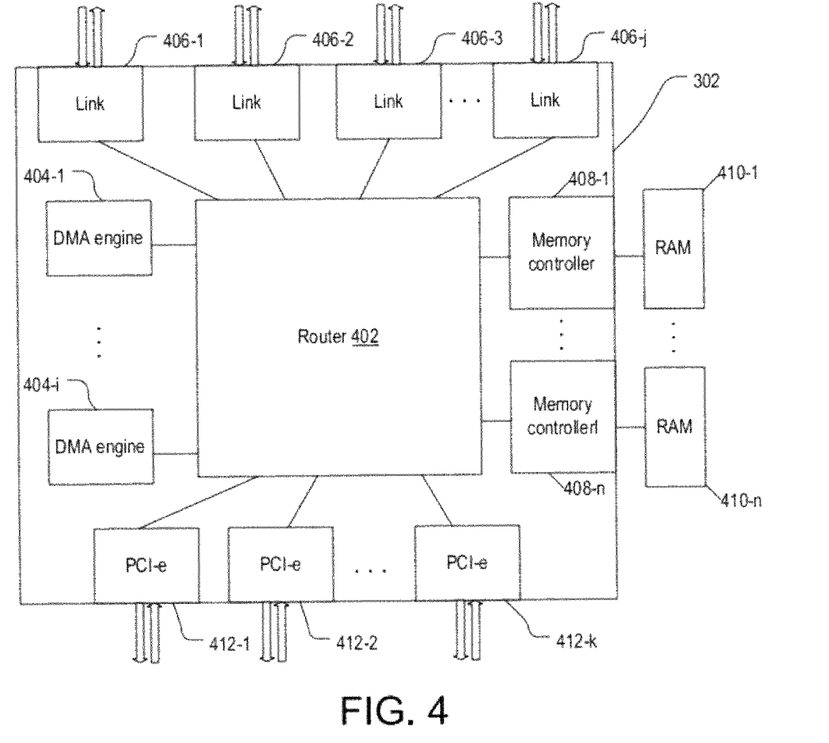
FIG. 4 illustrates a block diagram of an application specific integrated circuit (ASIC) in the node of FIG. 3 in one or more embodiments of the present disclosure.

FIG. 4 illustrates a block diagram of ASIC 302 in one or more embodiments of the present disclosure. ASIC 302 includes a router 402, DMA engines 404-1 to 404-j, link interface logics 406-1 to 406-j, memory controllers 408-1 to 408-n, data cache memories 410-1 to 410-n, and PCI-e interface logic 412-1 to 412-k.

Router 402 may be a crossbar switch that provides data paths between DMA engines 404-1 to 404-i, link interface logics 406-1 to 406-j, memory controllers 408-1 to 408-n, and PCI-e interface logic 412-1 to 412-k. Each DMA engine 404 may be assigned to a link 108 to another node. Each link interface logic 406 provides the physical signaling of the data over a link 108. Each memory controller 408 has independent control of its respective data cache memories 410. PCI-e interface logics 412-1 to 412-k couple ASCI 302 to PCI-e switches 306 in node 300.

Figure 5:
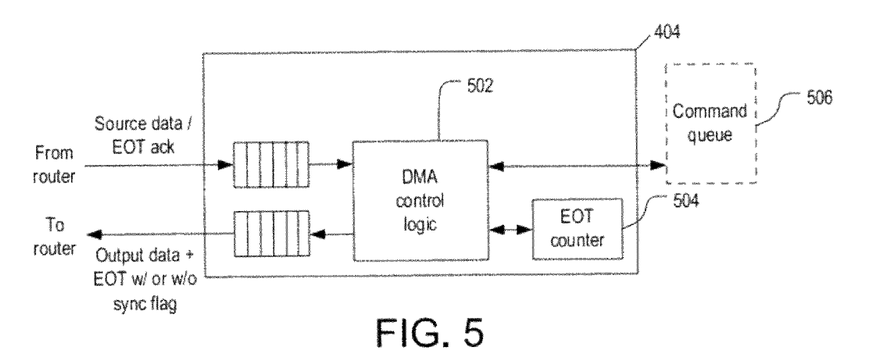
FIG. 5 illustrates a block diagram of a DMA engine of the ASIC of FIG. 4 in one or more embodiments of the present disclosure.

FIG. 5 illustrates a block diagram of a DMA engine 404 in one or more embodiments of the present disclosure. DMA engine 404 includes a DMA control logic 502 and an EOT counter 504. DMA control logic 502 takes a control block, one at a time, off a consumer end of a command queue 506. Command queue 506 may be located in data cache memories 410 or control cache memories 314 (FIG. 3). Processing the control block, DMA controller logic 502 retrieves data from one or more sources and then sends the data to a destination with an EOT message following the last datum. As described above, the EOT message includes a synchronization flag when the control block specifies that the local data cache memories of the sending node and the remote data cache memories of the receiving node are to be synchronized.

Figure 6:
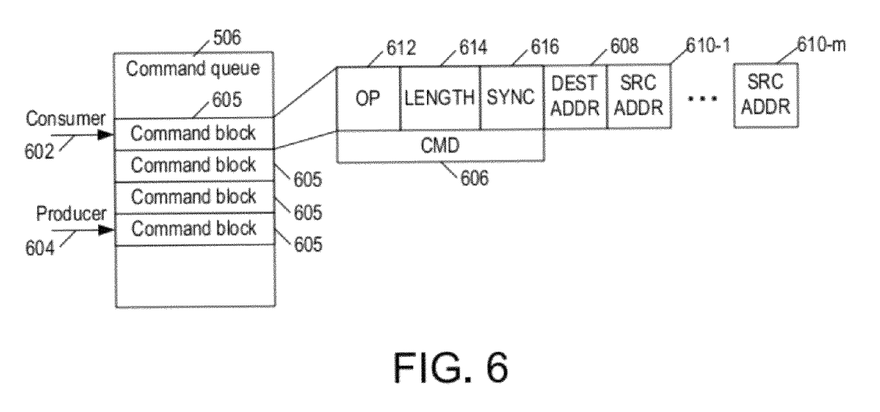
FIG. 6 illustrates a data structure of the command queue in one or more embodiments of the present disclosure.

FIG. 6 illustrates a data structure of command blocks in command queue 506 in one or more embodiments of the present disclosure. Command queue 506 includes a pointer 602 to the consumer end of the command queue and a pointer 604 to the producer end of the command queue. DMA control logic 502 (FIG. 5) takes one control block at a time from the consumer end while processor complex 312 (FIG. 3) write control blocks to the producer end.

Each command block includes a command 606 followed by a starting destination address 608 and one or more starting source addresses 610-1 to 610-m. Command 606 includes an operation 612, a length 614, and a synchronization flag 616. Operation 612 specifies the operation to be performed on the source data, such as copy, OR, or XOR. Length 614 specifies the length of the source data. When set, synchronization flag 616 specifies the local data cache memories of the sending node and the remote data cache memories of the receiving node are to be synchronized.

Figure 7:
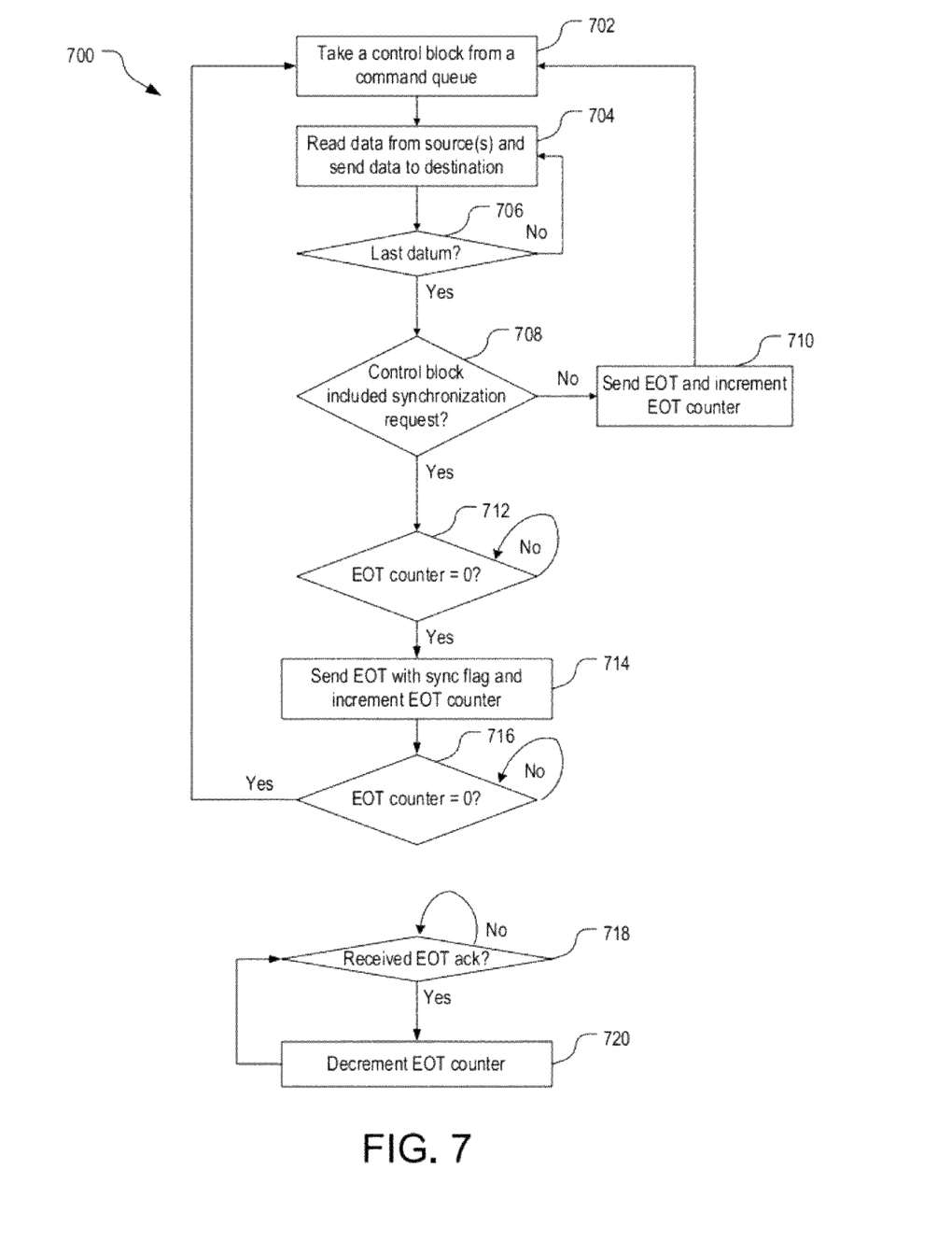
FIG. 7 is a flowchart of a method executed by the DMA engine of FIG. 5 in one or more embodiments of the present disclosure.

FIG. 7 is a flowchart of a method 700 executed by DMA engine 404, and more specifically DMA control logic 502, in one or more embodiments of the present disclosure. Method 700, and other methods described later, may comprise one or more operations, functions or actions as illustrated by one or more of blocks. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Method 700 may begin in block 702.

In block 702, DMA control logic 502 takes a command block from command queue 506 and parses the command block to determine an operation, a length, a synchronization flag, a starting destination address, and one or more starting source addresses. Block 702 may be followed by block 704.

In block 704, DMA control logic 502 reads one or more source data based on the one or more starting source addresses and the length, performs any specified logic operation such as OR or XOR, and sends the data to a destination based on the starting destination address. DMA engine 404 sends the data in one or more data writes (e.g., PCI data writes). Block 704 may be followed by block 706.

In block 706, DMA control logic 502 determines if it has sent the last datum. If not, block 706 may loop back to block 704. Otherwise block 706 may be followed by block 708.

In block 708, DMA control logic 502 determines if the local processor complex of the receiving node is to be interrupted based on the synchronization flag in the command block. If not, block 708 may be followed by block 710. Otherwise block 708 may be followed by block 712.

In block 710, DMA control logic 502 sends an EOT message without a synchronization flag and increments EOT counter 504 by one. Block 710 may loop back to block 702.

In block 712, DMA control logic 502 determines if the EOT counter 504 is at zero so that all outstanding EOT messages have been acknowledged. If so, block 712 may be followed by block 714. Otherwise block 712 loops back to itself and DMA control logic 502 waits until all outstanding EOT messages have been acknowledged.

In block 714, DMA control logic 502 sends an EOT message with a synchronization flag and increments EOT counter 504 by one. Block 714 may be followed by block 716.

In block 716, DMA control logic 502 determines if the EOT counter 504 is again at zero so the EOT message with the synchronization flag has been acknowledged, which implies that the data writes of all of the previous data transfers for this control block and previous control blocks up to the last synchronization point have been safely received at receiving node 208. If so, block 716 may loop back to block 702 to process another control block. Otherwise block 716 loops back to itself and DMA control logic 502 waits until all the EOT message with the synchronization flag has been acknowledged.

DMA control logic 502 also performs a parallel process to blocks 702 to 716 in response to any EOT acknowledgement. In block 718, DMA control logic 502 determines if it has received an EOT acknowledgement. If not, block 718 loops back to itself and DMA control logic 502 waits until it receives an EOT acknowledgement. Otherwise block 718 may be followed by block 720.

In block 720, DMA control logic 502 decrements the EOT counter 504 by one. Block 718 may loop back to block 716.

Figure 8:
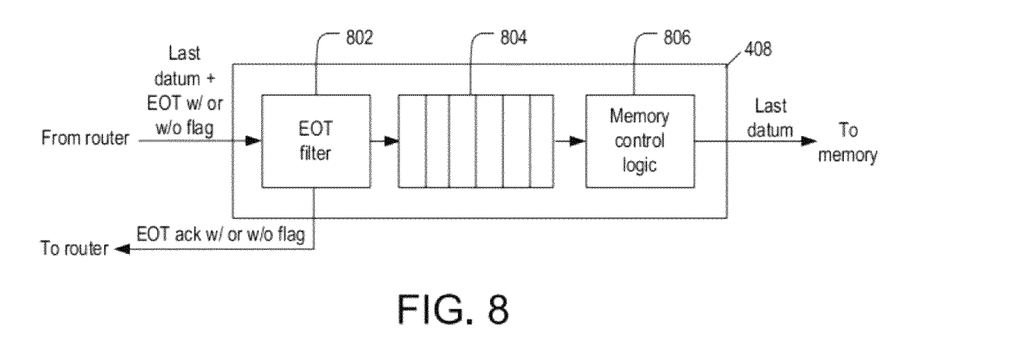
FIG. 8 illustrates a block diagram of a memory controller in the node of FIG. 3 in one or more embodiments of the present disclosure.

FIG. 8 illustrates a block diagram of a memory controller 408 in one or more embodiments of the present disclosure. Memory controller 408 includes an EOT filter logic 802, a queue 804, and a memory control logic 806.

EOT filter logic 802 detects any EOT message in the incoming command. The incoming commands may be a data read, a data write, or an EOT message. EOT filter logic 802 passes the data reads and data writes to queue 804, which is then processed by memory controller logic 806 for reading and writing data cache memories 410 (FIG. 4). Note that once data writes reach queue 804, any read of data cache memories 410 is guaranteed to see the new data. When an EOT message without a synchronization flag is detected, EOT filter logic 802 removes the EOT message and generates an EOT acknowledgement without a synchronization flag to the sending DMA engine at the sending node. When an EOT message with a synchronization flag is detected, EOT filter logic 802 removes the EOT message and generates an EOT acknowledgement with a synchronization flag to the sending DMA engine at the sending node.

Figure 9:
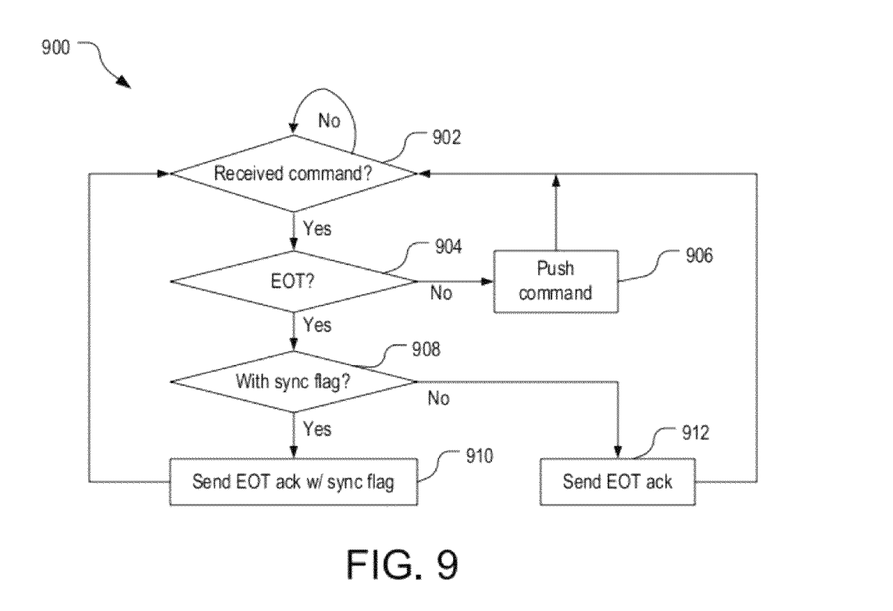
FIG. 9 is a flowchart of a method executed by the memory controller of FIG. 8 in one or more embodiments of the present disclosure.

FIG. 9 is a flowchart of a method 900 executed by memory controller 408, and more specifically EOT filter logic 802, in one or more embodiments of the present disclosure. Method 900 may begin in block 902.

In block 902, EOT filter logic 802 determines if it has received a command. If not, block 902 loops back to itself and EOT filter logic 802 waits until it receives a command. Otherwise block 902 may be followed by block 904.

In block 904, EOT filter logic 802 determines if the command is an EOT message. If not, block 904 may be followed by block 906. Otherwise block 904 may be followed by block 908.

In block 906, EOT filter logic 802 pushes the command to queue 804, which is then processed by memory controller logic 806 for writing or reading data cache memories 410. Block 906 may loop back to block 902.

In block 908, EOT filter logic 802 determines if the EOT message includes a synchronization flag. If so, block 908 may be followed by block 910. Otherwise block 908 may be followed by block 912.

In block 910, EOT filter logic 802 sends an EOT acknowledgment with a synchronization flag to the sending DMA engine at the sending node. Block 910 may loop back to block 902.

In block 912, EOT filter logic 802 sends an EOT acknowledgement without a synchronization flag to the sending DMA engine at the sending node. Block 912 may loop back to block 902.

Figure 10:
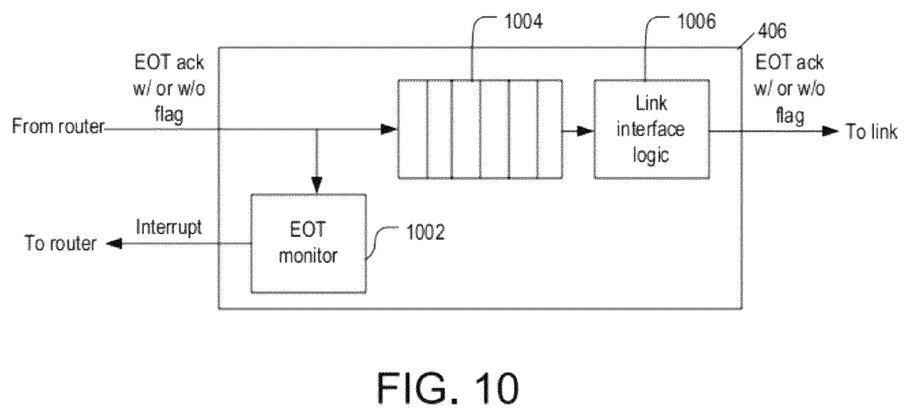
FIG. 10 illustrates a block diagram of a link interface logic in the node of FIG. 3 in one or more embodiments of the present disclosure.

FIG. 10 illustrates a block diagram of a link interface logic 406 in one or more embodiments of the present disclosure. Link interface logic 406 includes an EOT monitor 1002, a queue 1004, and a link interface logic 1006.

EOT monitor logic 1002 detects any EOT acknowledgement with the synchronization flag in outgoing messages on the link. EOT filter logic 1002 reads the outgoing messages on their way to queue 1004 before they are processed by link interface logic 1006 for transmission over link 108. When an EOT acknowledgement with the synchronization flag is detected, EOT monitor logic 1002 generates an interrupt to the local processor complex of the receiving node.

Figure 11:
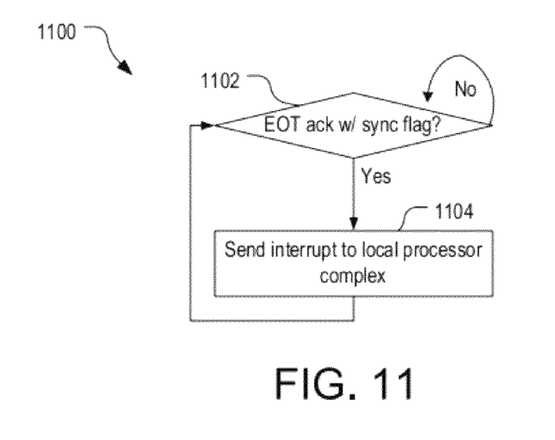
FIG. 11 is a flowchart of a method executed by the link interface logic of FIG. 10 in one or more embodiments of the present disclosure.

FIG. 11 is a flowchart of a method 1100 executed by link interface logic 406, and more specifically EOT monitor logic 1002, in one or more embodiments of the present disclosure. Method 1100 may begin in block 1102.

In block 1102, EOT monitor logic 1002 determines if it has detected an EOT acknowledgement with a synchronization flag. If so, block 1102 may be followed by block 1104. Otherwise block 1102 loops back to itself until EOT monitor logic 1002 detects an EOT acknowledgment with a synchronization flag.

In block 1104, EOT monitor logic 1002 sends an interrupt to the local processor complex of the receiving node. Block 1104 may loop back to block 1102.

Figure 12:
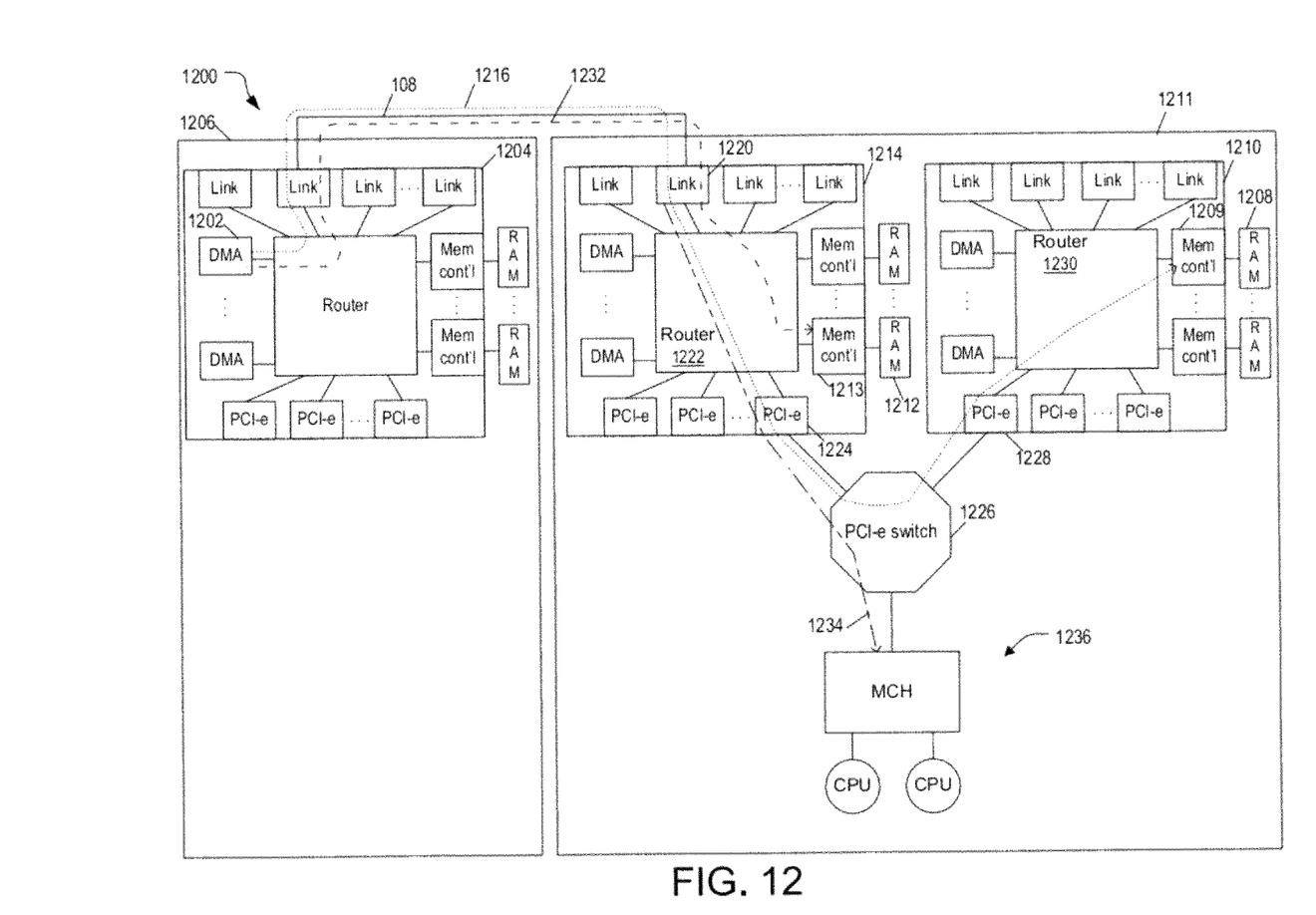
FIG. 12 is a block diagram demonstrating another data transfer between two controller nodes in one or more embodiments of the present disclosure.

The general concept of the present disclosure has been demonstrated with respect to FIG. 2. The general concept is now demonstrated in a different scenario. FIG. 12 is a block diagram demonstrating another data transfer between two controller nodes in one or more embodiments of the present disclosure.

FIG. 12 is a block diagram of a storage server 1200 in one or more embodiments of the present disclosure. Although not shown, storage server 1200 may be coupled to host computers and physical disk drives like storage server 100 (FIG. 1).

Assume there are two command blocks in a command queue for a DMA engine 1202 in a data transfer ASIC 1204 at a sending node 1206. The first command block is destined for a data cache memories 1208 connected to a memory controller 1209 in a data transfer ASIC 1210 at a receiving node 1211. The second command block is destined for data cache memories 1212 connected to a different memory controller 1213 in another data transfer ASIC 1214 at the same receiving node 1210. The second block includes a set synchronization flag.

According to the order of the command blocks in the command queue, DMA engine 1202 first processes the first command block. DMA engine 1202 sends data writes 1216 for the first command block over a link 108 to receiving node 1211. Data writes 1216 are first received by ASIC 1214 and then routed to ASIC 1210. ASIC 1214 routes data writes 1216 via a link interface logic 1220, router 1222, and PCI-e interface 1224 to a PCI-e switch 1226. PCIe switch 1226 routes data writes 1216 to ASIC 1210 at receiving node 1211. ASIC 1210 routes data writes 1216 via a PCI-e interface 1228 and router 1230 to memory controller 1209 for data cache memories 1208. As described above, the last data write is followed by an EOT message without a synchronization flag via the same path.

DMA engine 1202 next processes the second command block. DMA engine 1202 sends data writes 1232 for the second control block over link 108 to receiving node 1211. ASIC 1214 routes data write 1232 via link interface 1220 and router 1222 to memory controller 1213 for data cache memories 1212.

For whatever reasons, data writes 1216 for the first command block are delayed and data writes 1232 for the second command block complete first. As described above, DMA engine 1202 does not send an EOT message with a synchronization flag for the second command block until the outstanding EOT count is equal to zero.

Assuming the outstanding EOT count is now equal zero because DMA engine 1202 received an EOT acknowledgment for the first command block, the DMA engine then sends an EOT message with a synchronization flag for the second command block and increments the outstanding EOT count. DMA engine 1202 again waits until the outstanding EOT count returns to zero before processing the next command block.

In response to the EOT message with the synchronization flag, memory controller 1213 sends an EOT acknowledgement with a synchronization flag (not shown) to DMA engine 1202. When link interface logic 1220 detects the EOT acknowledgement with the synchronization flag being sent back to sending node 1206, it generates an interrupt 1234 to a local processor complex 1236 of receiving node 1211. When DMA engine 1202 receives the EOT acknowledgement with the synchronization flag, it decrements the outstanding EOT count and processes the next command block.

Various other adaptations and combinations of features of the embodiments disclosed are within the scope of the invention. Numerous embodiments are encompassed by the following claims.

What is claimed is:

1. A method for synchronizing memories on a first node and a second node, the first node comprising a direct memory access (DMA) engine for transferring data from the first node to the second node over a communication link between the first and the second nodes, the second node comprising a processor complex and independent memory controllers, the method comprising:
   the DMA engine reading a control block for a data transfer from a sequence of control blocks;
   in response to the control block, the DMA engine sending data specified by the control block over the communication link to the second node;
   when the control block does not specify synchronization between the memories on the first and the second nodes:
      the DMA engine sending an end of transfer (EOT) message after a last datum of the control block and incrementing a counter for EOT messages to the second node; and
      after sending the EOT message, the DMA engine processing any subsequent control block; and
   when the control block specifies synchronization between the memories on the first and the second nodes:
      the DMA engine determining if the counter is at zero so there is no unacknowledged EOT message;

when the counter is at zero, the DMA engine sending an EOT message with a synchronization flag after the last datum and incrementing the counter; and after sending the EOT message with the synchronization flag, the DMA engine determining if the counter is again at zero so the EOT message with the synchronization flag has been acknowledged;

when the counter is again at zero, the DMA engine processing any subsequent control block.

2. The method of claim 1, further comprising:

one of the memory controllers receiving the data specified by the control block and the EOT message with or without the synchronization flag;

the memory controller pushing the data to a memory queue for a memory in the second node;

the memory controller extracting the EOT message and determining if it includes the synchronization flag; and when the EOT message does not include the synchronization flag, the memory controller sending an EOT acknowledgment without a synchronization flag over the communication link to the first node; and when the EOT message includes the synchronization flag, the memory controller sending an EOT acknowledgment with a synchronization flag over the communication link to the first node.

3. The method of claim 2, wherein the second node further comprises a link interface coupled to the communication link, the method further comprising:

the link interface receiving the EOT acknowledgement with or without the synchronization flag;

the link interface forwarding the EOT acknowledgment over the communication link to the first node;

the link interface determining if the EOT acknowledgment includes the synchronization flag; and when the EOT acknowledgement includes the synchronization flag, the link interface sending an interrupt to the processor complex of the second node.

4. The method of claim 3, further comprising:

the DMA engine receiving the EOT acknowledgement with or without the synchronization flag from the second node; and the DMA engine decrementing the counter in response to the EOT acknowledgement.

5. The method of claim 4, wherein the control block comprises an operation, a length of the data, a destination interrupt, a starting destination address, and one or more starting source addresses.

6. A system, comprising:

a first node, comprising:
  a first data cache memory; and
  a first application specific integrated circuit (ASIC), comprising:
    a first memory controller coupled to the first data cache memory;
    a first link interface; and
    a direct memory access (DMA) engine coupled to the first memory controller and the first link interface, the DMA engine comprising:
      a counter; and
      a DMA control logic;

a second node, comprising:
  a processor complex;
  a control cache memory;
  a chipset coupled to the processor complex and the control cache memory;
  switches coupled to the chipset;
  a second data cache memory; and
  a second ASIC, comprising:
    local interfaces to the second switches;
    a second link interface; and
    a second memory controller coupled to the second cache memory; and a communication link coupled to the first and the second link interfaces;

when the DMA control logic is configured to process a sequence of control blocks, comprising:
  when a control block does not specify synchronization between the first and the second data cache memories on the first and the second nodes:
    sending an end of transfer (EOT) message after a last datum of the control block and incrementing a counter for EOT acknowledgments; and
    after sending the EOT message, processing any subsequent control block; and
  when a control block specifies synchronization between the first and the second data cache memories on the first and the second nodes:
    when the counter is at zero, sending an EOT message with a synchronization flag after the last datum and incrementing the counter;
    after sending the EOT message with the synchronization flag, determining if the counter is again at zero; and
    when the counter is again at zero, processing any subsequent control block.

7. The system of claim 6, wherein the second memory controller is configured to process EOT messages from the first node, comprising:

extracting the EOT message with or without the synchronization flag;

determining if the EOT message includes the synchronization flag;

when the EOT message does not include the synchronization flag, sending an EOT acknowledgment over the communication link to the first node; and when the EOT message includes the synchronization flag, sending the EOT acknowledgment with a synchronization flag over the communication link to the first node.

8. The system of claim 7, wherein the second link interface is configured to detect EOT acknowledgments from the second node to the first node;

detecting the EOT acknowledgement with or without the synchronization flag;

when the EOT acknowledgement includes the synchronization flag, sending an interrupt to the processor complex.

* * * * *